United States Patent [19]

Nath

[11] 3,850,837
[45] Nov. 26, 1974

[54] PREPARATION OF RARE-EARTH OXYSULFIDE LUMINESCENT MATERIAL

[75] Inventor: Dilip K. Nath, Mayfield, Ohio

[73] Assignee: General Electric Company, Cleveland, Ohio

[22] Filed: Aug. 11, 1972

[21] Appl. No.: 279,931

[52] U.S. Cl. .......................................... 252/301.4 S
[51] Int. Cl. ............................................... C09k 1/14
[58] Field of Search ............................... 252/301.4 S

[56] References Cited
UNITED STATES PATENTS
3,502,590  3/1970  Royce et al.................. 252/301.4 S
3,541,022  11/1970  Hewes.......................... 252/301.4 S
3,647,707  3/1972  Gillooly et al............... 252/301.4 S Primary Examiner—Jack Cooper
Attorney, Agent, or Firm—John F. McDevitt

[57] ABSTRACT

Rare earth oxide mixtures are converted to the corresponding rare earth oxysulfide luminescent material with $H_2S$ by heating the mixture with a sulfurizing compound selected from the group consisting of KHS and a potassium compound which reacts to form KHS upon heating with $H_2S$ and thereafter recrystallizing the oxysulfide material with an alkali metal sulfide.

5 Claims, No Drawings

PREPARATION OF RARE-EARTH OXYSULFIDE LUMINESCENT MATERIAL

BACKGROUND OF THE INVENTION

The present invention relates to a process for preparing improved luminescent materials. More particularly, it relates to a process of preparing a rare earth oxysulfide luminescent material by converting rare earth oxide mixtures through reaction with $H_2S$ gas in the presence of novel sulfurizing compounds and thereafter recrystallizing the luminescent material in molten alkali metal sulfide to provide a product having improved utilization characteristics.

Rare earth oxysulfide luminescent materials such as $Y_2O_2S$: Eu (yttrium oxysulfide activated with europium) have previously been produced by various processes, including both single step and multi-step processes. For instance, compounds of the constituent materials have been mixed together with mineralizing agents such as other compounds which produce an alkali metal sulfide and a polysulfide upon heating. Specifically, such mineralizing agents have included alkali thiosulfate and a mixture of sulfur with alkali carbonate. However, such processes have tended to produce $Y_2O_2S$: Eu mixed with a variety of residual compounds, some of which are deleterious, and none of which are desired, being at least wasteful diluents. Also, these undesired reaction products are often difficult to remove from the luminescent material or phosphor. Particularly, undesirable contaminants include unreacted $Y_2O_3$, $Y_2S_3$, $NaYS_2$, and polymeric sulfides of sodium.

In my copending application Ser. No. 263,418 filed June 16, 1972 which is entitled "PREPARATION OF RARE EARTH OXYSULFIDE LUMINESCENT MATERIAL;" and is assigned to the assignee of the present invention, there is disclosed a process of preparing the rare earth oxysulfide luminescent material which produces improved phosphor crystals that are essentially contaminant-free. More particularly, said process produces the rare earth oxysulfide luminescent material by converting rare earth oxide mixtures through reaction with $H_2S$ gas in a particular liquid fluxing medium and thereafter recrystallizing the luminescent material in the same fluxing medium under different heating conditions. Still more specifically, the liquid fluxing medium in my earlier discovered process contains an alkali metal sulfide and a sulfur compound which generates $SO_2$ at the conversion temperatures such as an alkali metal sulfite to inhibit formation of contamination products in the oxysulfide material.

SUMMARY OF THE INVENTION

It has now been discovered that a comparable oxysulfide phosphor product can be produced by a novel process wherein a sulfurizing compound which accomplishes the conversion of the rare earth oxide host material to an oxysulfide is regenerated and at lower conversion temperatures than heretofore employed.

Briefly stated, the present invention provides a process for heating a rare earth oxide mixture and a sulfurizing compound selected from the group consisting of KHS and a potassium compound which reacts to form KHS upon heating with $H_2S$ until the oxysulfide material is formed and then recrystallizes the oxysulfide material with an alkali metal sulfide under different heating conditions. In certain of its preferred embodiments, the oxysulfides of yttrium, gadolinium, lanthanum, and lutetium are prepared with europium and/or terbium as the activators. The rare earth oxide mixture is prepared in the preferred embodiments by heating a mixture of rare earth compounds in the stoichiometric proportions needed for activation of the luminescent material under oxidizing conditions. Said rare earth oxide mixture is thereafter mixed with the sulfurizing compound to form a blended product which is heated to elevated temperatures in the range from about 500°C to about 700°C in the presence of $H_2S$ gas until the oxysulfide material is formed. The oxysulfide material is thereafter blended with an alkali metal sulfide which serves as the fluxing medium and heated at more elevated temperatures in the range from about 1050°C to about 1450°C in a neutral atmosphere until the oxysulfide material has been recrystallized.

DESCRIPTION OF THE PREFERRED EMBODIMENTS

In the present invention, an efficient method of converting rare earth oxides or other rare earth compounds to rare earth oxysulfides is provided wherein said conversion is carried out in molten KHS or some other potassium compound which can be reacted with gaseous $H_2S$ at the conversion temperatures to form the molten KHS for the sulfurization to take place. Whereas the preferred sulfurizing agent is KHS which melts at 455°C and remains quite stable at the conversion temperatures of 500°C and higher, there can also be used a potassium compound such as KOH which reacts in a molten condition at these temperatures with the gaseous $H_2S$ to generate the sulfurizing agent. The present conversion reaction further involves regeneration of the sulfurizing agent by chemical reaction of the conversion products with the $H_2S$ continuously being supplied. More particularly, the KOH formed by reaction between KSH and the rare earth oxide is thereafter reacted with $H_2S$ to regenerate KSH. The principal chemical reactions which occur in the above described conversion process including regeneration of the sulfurizing agent are shown below:

$$KOH + H_2S = KHS + H_2O$$

$$KHS + Y_2O_3 = KOH + Y_2O_2S$$

$$KOH + H_2S = KHS + H_2O$$

In the above conversion process, it can be seen that KOH as a conversion product is thereafter reacted with $H_2S$ to form the KHS sulfurizing agent. Lithium and sodium hydrogen sulfides are not useful sulfurizing agents because these compounds decompose at much lower temperatures than needed for the conversion reaction to take place. Additionally, the chemical reaction of $H_2S$ with both LiOH and NaOH produces undesirable sulfides and polysulfides.

The subsequent recrystallization of the rare earth oxysulfide luminescent materials including $Gd_2O_2S$: Tb, $La_2O_2S$: Eu, and $Y_2O_2S$: Eu is accomplished by separating the oxysulfide material from the residue in the conversion process above described and thereafter heating a mixture of said material with an alkali metal sulfide in an inert atmosphere to elevated temperatures in a range from about 1050°C to 1450°C. For example, the oxysulfide material produced in the above conversion process can be washed with deionized water until the pH is neutral to provide an efficient separation for the recrystallization step. The separated material can then be filtered, dried and mixed with approximately 30 weight percent $Na_2S$ flakes in a mixture for recrystallization. The KHS sulfurizing agent can also be prepared separately by passing $H_2S$ in a solution of potassium alcoholate, adding excess benzene and distilling off the alcohol as an azeotropic mixture from the system. The KHS precipitate is dried under vacuum to produce a suitable sulfurizing agent.

As in conventional phosphor nomenclature, the element or elements identified after the colon in the above recited chemical formulas representing the phosphor compositions of the present invention is the activator element. Unless indicated otherwise, the activator is incorporated in the host lattice in partial substitution for one of the constituents. In these cases, the rare earth activator substitutes for proportional quantities of the rare earth of the oxysulfide host. For instance, such a phosphor containing five percent (5 percent) Eu as an activator would have the Eu substituted for five percent (5 percent) of $La_2O_3$. Suitable activators for various purposes of such oxysulfide phosphors can be selected from the rare earths including Dy, Er, Eu, Ho, Nd, Pr, Sm, Tb, and Tm. Activator contents, measured as x in accordance with the formula:

$$Ln_{(2-x)}Ln^1{}_xO_2S$$

wherein Ln is one or more of Y, Gd, La, and Lu, and $Ln^1$ is one or more of Dy, Er, Eu, Ho, Nd, Pr, Sm, Tb, and Tm, can range at least from 0.0002 to 0.2 with about 0.03 to 0.05 being preferred. Because of the commercial interest in $Y_2O_2S$: Eu, detailed examples will be given of the application of the invention primarily to that phosphor. The following exemplary description includes the production and recrystallization of the $Y_2O_2S$: Eu phosphor.

Example I

A 9.5 gram batch of $Y_2O_3$ containing 3.75 mole percent Eu is mixed with 2.24 grams of solid KOH beads and fired in a conventional furnace through which is passed a stream of nitrogen gas at 200°C until all air has been displaced from the furnace. A stream of $H_2S$ gas is next introduced to the furnace while the temperature is raised to 520°C and held at said temperature for 1 hour or more until the conversion process has been carried out. Upon completion of the conversion reaction, the $H_2S$ is terminated and the conversion products allowed to cool to room temperature while the nitrogen atmosphere is continued. The conversion products are then washed with deionized water until the pH is neutral, thereby signifying removal of all soluble residue. The purified conversion product is then filtered, dried and mixed with 30 weight percent $Na_2S$ flakes. The recrystallization mixture is then heated in an atmosphere of an inert gas ($N_2$) to a temperature of around 1000°C or above, preferably 1160°C, for an additional 2 hours. The recrystallized phosphor product is then cooled to room temperature in the same inert gas atmosphere. The cooled phosphor is then washed with boiling deionized water until the pH is neutral and then filtered and dried to provide the final oxysulfide phosphor having a particle size, brightness and crystalline form of optimum quality.

Example II

A mixture of europium and yttrium oxides is slurried in water, then dissolved by addition of $HNO_3$ with heating for several minutes. The solution is cooled to about 50°C and oxalic acid is added as a 10 percent aqueous solution in amounts such as 120 to 200 percent of the stoichiometric amount, preferably about 120 percent with the reaction mixture being stirred for about 5 minutes during which time the oxalates of yttrium and europium are coprecipitated. The coprecipitated oxalates are removed by filtration, then dried at about 110°C and then fired to the oxide mixture in air for about 1 hour at about 1100°C. This gives the mixed yttrium oxide and activator in a form suitable for use in the production of $Y_2O_2S$: Eu. More specifically, 10.80 grams of $Y_2O_3$ are dissolved with 0.79 grams of $Eu_2O_3$, coprecipitated with 22.7 grams of $H_2C_2O_4 \cdot 2H_2O$, dried and fired to the oxides as described above.

A batch of 9.5 grams of the yttrium-europium oxide mixture above prepared is subsequently mixed with 5 grams of KHS and said mixture then heated in an atmosphere of gaseous hydrogen sulfides to elevated temperatures in the range 500°C–700°C, preferably around 520°C for sufficient time to produce the yttrium-europium oxysulfide. The conversion product is then washed with deionized water until the pH is neutral and then filtered and dried. Ten grams of the prepared oxysulfide luminescent material is then mixed with between 1 to 5 grams of 60 percent $Na_2S$ hydrated flake, preferably about (3 grams, and the recrystallization mixture then fired in an inert atmosphere between 1100°C–1300°C, preferably about 1150°C for 1–2 hours to provide the recrystallized phosphor. The recrystallized phosphor is then cooled in an inert atmosphere, crushed and repeatedly washed in water to remove sodium sulfide residue and provide a final product comparable to that obtained in Example I.

Similar processes can be used to prepare other embodiments to the present invention. For example, $Li_2S$, $K_2S$, or mixtures of either compound with each other or with $Na_2S$ can be used as the fluxing medium for recrystallization in the same molar proportions as for the $Na_2S$ flux. With these other fluxes, somewhat different recrystallization temperatures may prove more effective as for example, a recrystallization temperature of 1200°C has been used successfully with $Li_2S$, and $K_2S$ as the recrystallization fluxes. For the production of oxysulfides of other lanthanides which can be used, compounds of Gd, La, or Lu can be substituted for the compounds of Y, and Eu and/or Tb as activators, with appropriate adjustments known in the art being made in the weight of the ingredients to maintain the mole proportions, along with similarly known adjustments being made in the ingredients to obtain the desired activator level.

What I claim as new and desire to secure by Letters Patent of the United States is:

1. A method for preparation of a crystalline rare earth oxysulfide luminescent material selected from the oxysulfides of yttrium, gadolinium, lanthanum, and lutetium which comprises:

a. heating a rare earth oxide mixture in $H_2S$ gas to elevated temperatures in the range from about 500°C to 700°C with a sulfurizing compound selected from the group consisting of KHS and a potassium compound which reacts to form KHS upon heating with $H_2S$ until the oxysulfide material is produced in accordance with the formula $Ln_{(2-x)}Ln'{}_xO_2S$ wherein Ln is one or more of Y, Gd, La, and Lu;

Ln' is one or more of Dy, Er, Eu, Ho, Nd, Pr, Sm, Tb, and Tm; and $x$ is in the range 0.0002 to 0.2, and b. recrystallizing the oxysulfide material by heating with an alkali metal sulfide in an inert atmosphere to elevated temperatures in the range from about 1050°C to 1450°C.

2. A method as in claim 1 wherein the rare earth oxysulfide luminescent material is $Y_2O_2S$ activated with europium.

3. A method for preparation of a crystalline rare earth oxysulfide luminescent material selected from the oxysulfides of yttrium, gadolinium, lanthanum, and lutetium which comprises:

a. heating a mixture of rare earth salts which form oxides in air to elevated temperatures in the range from about 500°C to 1100°C until the oxides are formed, b. mixing said rare earth oxide mixture and a sulfurizing compound selected from the group consisting of KHS and a potassium compound which reacts to form KHS upon heating with $H_2S$ and heating said mixture in $H_2S$ gas to elevated temperatures in the range from about 500°C to 700°C until the oxysulfide material is produced in accordance with the formula $Ln_{(2-x)}Ln'O_2S$ wherein Ln is one or more of Y, Gd, La, and Lu; Ln' is one or more of Dy, Er, Eu, Ho, Nd, Pr, Sm, Tb, and Tm; and $x$ is in the range 0.0002 to 0.2, and c. recrystallizing the oxysulfide material by heating with an alkali metal sulfide in an inert atmosphere to elevated temperatures in the range from about 1050°C to 1450°C.

4. A method as in claim 3 wherein the rare earth oxysulfide luminescent material is $Y_2O_2S$ activated with europium and the alkali metal sulfide is $Na_2S$.

5. A method for preparation of crystalline $Y_2O_2S$ activated with europium which comprises:

(a) heating a mixture of $Y_2O_3$ with activator amounts of $Eu_2O_3$ and a sulfurizing compound selected from the group consisting of KHS and KOH to elevated temperatures in the range from about 500°C to 700°C while admitting a stream of $H_2S$ until the $Y_2O_2S$: Eu material is produced, and (b) recrystallizing the $Y_2O_2S$: Eu material by heating with molten $Na_2S$ in an inert atmosphere to elevated temperatures in the range from about 1050°C to 1450°C.

* * * * *